US012623926B2

(12) United States Patent
Li et al.

(10) Patent No.: US 12,623,926 B2
(45) Date of Patent: May 12, 2026

(54) BIDIRECTIONAL FLOW PULSE-BASED WATER BODY PHOSPHORUS REMOVAL APPARATUS AND METHOD, AND ORGANIC NUTRIENT SOIL

(71) Applicant: BEIJING DRAINAGE GROUP CO., LTD, Beijing (CN)

(72) Inventors: Kuixiao Li, Beijing (CN); Yulong Shi, Beijing (CN); Qi Xu, Beijing (CN); Gang Wang, Beijing (CN); Jiawei Wang, Beijing (CN); Haipeng Bao, Beijing (CN); Guanglu Li, Beijing (CN); Fuliang Ma, Beijing (CN)

(73) Assignee: BEIJING DRAINAGE GROUP CO., LTD, Beijing (CN)

( * ) Notice: Subject to any disclaimer, the term of this patent is extended or adjusted under 35 U.S.C. 154(b) by 427 days.

(21) Appl. No.: 18/550,722

(22) PCT Filed: Nov. 25, 2021

(86) PCT No.: PCT/CN2021/133131
§ 371 (c)(1),
(2) Date: Sep. 15, 2023

(87) PCT Pub. No.: WO2022/267332
PCT Pub. Date: Dec. 29, 2022

(65) Prior Publication Data
US 2024/0190724 A1    Jun. 13, 2024

(30) Foreign Application Priority Data

Jun. 23, 2021    (CN) .......................... 202110700692.0

(51) Int. Cl.
*C02F 1/28*       (2023.01)
*C02F 1/00*       (2023.01)
*C02F 101/10*     (2006.01)

(52) U.S. Cl.
CPC ................ *C02F 1/28* (2013.01); *C02F 1/001* (2013.01); *C02F 1/008* (2013.01);
(Continued)

(58) Field of Classification Search
CPC .. C02F 1/001; C02F 1/008; C02F 1/28; C02F 2101/105; C02F 2201/005; C02F 2209/03; C02F 2209/42; C02F 2303/16
See application file for complete search history.

(56) References Cited

FOREIGN PATENT DOCUMENTS

CN        101172700 A      5/2008
CN        109081467 A    * 12/2018    ................ C02F 1/52
(Continued)

OTHER PUBLICATIONS

CN210313775U—EPO Machine Translation (Year: 2025).*
CN109081467A—EPO Machine Translation (Year: 2025).*

*Primary Examiner* — Patrick Orme
(74) *Attorney, Agent, or Firm* — FisherBroyles, LLP; Roger L. Browdy; Ronni S. Jillions

(57)        ABSTRACT

A bidirectional flow pulse-based water body phosphorus removal apparatus and a method, and an organic nutrient soil. The water body phosphorus removal apparatus includes: a prefiltration unit, a bidirectional flow phosphorus removal filtration pool, a bidirectional water collection and distribution system, a filtration pool stratified gas pulse system, a water production tank and a control system. A filtration layer filled with a phosphorus removal filtration material is provided in the bidirectional flow phosphorus removal filtration pool. The control system is used for controlling the bidirectional water collection and distribution system to alternately perform upward water in-and-out flow and downward water in-and-out flow on the bidirectional flow phosphorus removal filtration pool, so as to control the bidirectional flow phosphorus removal filtration
(Continued)

pool to switch between an upward flow filtration adsorption mode for phosphorus removal and a downward flow filtration adsorption mode for phosphorus removal.

10 Claims, 3 Drawing Sheets

(52) U.S. Cl.
CPC .. *C02F 2101/105* (2013.01); *C02F 2201/005* (2013.01); *C02F 2209/03* (2013.01); *C02F 2209/42* (2013.01); *C02F 2303/16* (2013.01)

(56) References Cited

FOREIGN PATENT DOCUMENTS

| | | | | |
|----|------------|---|---|---------|
| CN | 110386736  | A |   | 10/2019 |
| CN | 210313775  | U | * | 4/2020  |
| CN | 113461190  | A |   | 10/2021 |
| CN | 215439900  | U |   | 1/2022  |
| JP | H03123693  | A |   | 5/1991  |

* cited by examiner

BIDIRECTIONAL FLOW PULSE-BASED WATER BODY PHOSPHORUS REMOVAL APPARATUS AND METHOD, AND ORGANIC NUTRIENT SOIL

FIELD OF TECHNOLOGY

The present disclosure belongs to the technical field of sewage treatment, and more specifically relates to a bidirectional flow pulse-based water body phosphorus removal apparatus and a method, and an organic nutrient soil.

BACKGROUND

Phosphorus is a mineral element necessary for humans to maintain life activities and production activities. The phosphorus exists in phosphate rock ores and is not a natural renewable resource on earth. It has been reported that the amount of mineable phosphate ores in the world is about 7 billion tons. With continuous increase of the population, the phosphorus is increasingly consumed every year. When the phosphorus is increasingly consumed at a rate of 2% per year, phosphate ore reserves can only be used by humans for about 100 years. Therefore, more and more attention has been paid to resource recycling of the phosphorus by governments of various countries around the world.

Recovery of phosphorus from a reclaimed water plant is a key link of a social cycle of phosphorus. Phosphorus in effluent water of the reclaimed water plant is an important phosphorus source in receiving water. At present, the annual output of reclaimed water in Beijing is about 1 billion cubic meters, in which nearly 80% is reused as water in landscape environments. Although the content (TP<0.3 mg/L) of phosphorus in the reclaimed water satisfies "Discharge Standard of Reclaimed Water Pollutants for Municipal Wastewater Treatment Plants" (DB11/890-2012), the phosphorus concentration level in the reclaimed water discharge standard is far greater than the phosphorus concentration level (TP<0.025 mg/L) required for maintaining a good water environment based on evaluation criteria for nutrient levels of lakes stipulated by the Environmental Protection Agency (EPA) of the United States. Excessive content of the phosphorus in water will accelerate algae reproduction, leading to eutrophication, decrease of dissolved oxygen concentration in water and anoxic death of aquatic organisms, thereby seriously damaging the ecological environment. Therefore, deep phosphorus removal and phosphorus recovery of reclaimed water can not only maintain a good water ecological environment, but also realize sustainable utilization of phosphorus resources.

Adsorption for phosphorus removal is an effective method for deep phosphorus removal. At present, most of artificially synthetic phosphorus removal filtration materials are metal oxides and composite materials thereof, and most of phosphorus removal filtration pools use a downward flow filtration mode. It has been found during long-term operation that a filtration layer in a downward flow phosphorus removal filtration pool is prone to the problems of blocking and hardening, and due to the monotonous downward flow filtration mode, the adsorption capacity of a filtration material at a lower part of the filtration layer cannot be fully utilized.

SUMMARY

The purpose of the present disclosure is to provide a bidirectional flow pulse-based water body phosphorus removal apparatus and a method, and an organic nutrient soil. The apparatus can prevent the problems of blocking and hardening of a filtration layer by switching between an upward flow filtration adsorption mode and a downward flow filtration adsorption mode, and the adsorption capacity of the filtration layer can be fully utilized.

In order to realize the above purpose, in a first aspect, the present disclosure provides a bidirectional flow pulse-based water body phosphorus removal apparatus. The water body phosphorus removal apparatus includes: a prefiltration unit, a bidirectional flow phosphorus removal filtration pool, a bidirectional water collection and distribution system, a filtration pool stratified gas pulse system, a water production tank and a control system;

a filtration layer filled with a phosphorus removal filtration material is provided in the bidirectional flow phosphorus removal filtration pool;

the control system is used for controlling the bidirectional water collection and distribution system to alternately perform upward water in-and-out flow and downward water in-and-out flow on the bidirectional flow phosphorus removal filtration pool, so as to control the bidirectional flow phosphorus removal filtration pool to switch between an upward flow filtration adsorption mode for phosphorus removal and a downward flow filtration adsorption mode for phosphorus removal;

the control system is used for controlling the filtration pool stratified gas pulse system to perform stratified pulse gas flushing on the filtration layer.

Specifically, below the filtration layer, a lower water inlet and a lower water outlet are provided on the bidirectional flow phosphorus removal filtration pool, and above the filtration layer, an upper water inlet and an upper water outlet are provided on the bidirectional flow phosphorus removal filtration pool;

the bidirectional water collection and distribution system includes a water inlet pipe and a water production pipe;

the water inlet pipe includes a main water inlet pipe, a first water inlet branch pipe and a second water inlet branch pipe that are communicated with a water outlet end of the main water inlet pipe, a variable frequency pump is provided on the main water inlet pipe, the first water inlet branch pipe is communicated with the lower water inlet, and the second water inlet branch pipe is communicated with the upper water inlet. A fifth electric valve and a pressure transmitter are provided on the first water inlet branch pipe. A sixth electric valve is provided on the second water inlet branch pipe;

the water production pipe includes an upward flow water production branch pipe, a downward flow water production branch pipe, a primary produced water discharge pipe and a main water production pipe that are communicated with water outlet ends of the upward flow water production branch pipe and the downward flow water production branch pipe, respectively. A third electric valve is provided on the upward flow water production branch pipe. A fourth electric valve is provided on the downward flow water production branch pipe. The main water production pipe is communicated with the water production tank, and a second electric valve is provided thereon. The primary produced water discharge pipe is communicated with a water inlet pipe of the prefiltration unit, and a first electric valve is provided thereon.

the apparatus includes a water quality monitor and a liquid level gauge. The water quality monitor is used for monitoring the quality of water in the upward flow water production branch pipe and the downward flow water production branch pipe. The liquid level gauge is provided above the filtration layer in the apparatus;

the control system is used for controlling opening and closing and operation frequency of the variable frequency pump, controlling the fifth electric valve and the sixth electric valve to be switched on or off, and comparing a data signal of the water quality monitor with a preset value. When the data signal is greater than the preset value, the control system is used for controlling the first electric valve to stay in a switched on state, and upward flow produced water and downward flow produced water flow back to the water inlet pipe of the prefiltration unit through the primary produced water discharge pipe for recycling treatment. When the data signal is equal to or less than the preset value, the control system is used for controlling the second electric valve to stay in a switched on state, and upward flow produced water and downward flow produced water flow into the water production tank through the main water production pipe.

Preferably, the filtration pool stratified gas pulse system includes a gas supply device and pulse units. Each pulse unit includes at least one group of pulse jet pipes, a pipe for connecting the pulse jet pipes with the gas supply device, and a pulse valve provided on the pipe;

the pulse jet pipes are distributed in a height direction of the filtration layer, wherein the bottommost pulse jet pipe is positioned below the filtration layer and above the lower water inlet and the lower water outlet;

when the bidirectional flow phosphorus removal filtration pool stays in an upward flow filtration adsorption mode, the control system is used for controlling opening and closing of the gas supply device and the pulse valves to perform stratified pulse gas flushing on the filtration layer.

Preferably, the pulse jet pipes include main jet pipes and a plurality of branch jet pipes communicated with the main jet pipes. A plurality of gas holes or a plurality of nozzles are provided on each of the main jet pipes, and a sieve made from an anti-corrosion material is provided on each of the gas holes or each of the nozzles. The sieves can prevent the gas holes or the nozzles from being blocked.

More preferably, the control system is used for controlling the water inlet pipe to alternately perform upward water inflow and downward water inflow on the bidirectional flow phosphorus removal filtration pool according to a preset upward flow filtration time and a downward flow filtration time, or a pressure value detected by the pressure transmitter and a liquid level height in the apparatus detected by the liquid level gauge, so as to enable the bidirectional flow phosphorus removal filtration pool to switch between an upward flow filtration adsorption mode and a downward flow filtration adsorption mode.

Preferably, in the upward flow filtration adsorption mode, the variable frequency pump operates at a high frequency, the fifth electric valve is switched on, the sixth electric valve is switched off, and the control system is used for comparing a data signal of the pressure transmitter with a preset pressure value. When the data signal is less than the preset pressure value, the bidirectional flow phosphorus removal filtration pool maintains the upward flow filtration adsorption mode. When the data signal is greater than the preset pressure value, the control system is used for controlling the variable frequency pump to operate at a low frequency, the fifth electric valve is switched off, the sixth electric valve is switched on, and the bidirectional flow phosphorus removal filtration pool is switched from the upward flow filtration adsorption mode to the downward flow filtration adsorption mode. In the downward flow filtration adsorption mode, the control system is used for comparing a data signal of the liquid level gauge with a preset liquid level value. When the data signal is less than the preset liquid level value, the bidirectional flow phosphorus removal filtration pool maintains the downward flow filtration adsorption mode. When the data signal is greater than the preset liquid level value, the control system is used for controlling the variable frequency pump to operate at a high frequency, the fifth electric valve is switched on, the sixth electric valve is switched off, and the bidirectional flow phosphorus removal filtration pool is switched from the downward flow filtration adsorption mode to the upward flow filtration adsorption mode.

Preferably, a water distributor is provided at the top of the bidirectional flow phosphorus removal filtration pool. A filtration material regeneration lye inlet is provided on the bidirectional flow phosphorus removal filtration pool. The filtration material regeneration lye inlet and the upper water inlet are both communicated with the water distributor.

Preferably, the water quality monitor is used for on-line monitoring of the turbidity and phosphate of produced water in the upward flow water production branch pipe and the downward flow water production branch pipe.

Preferably, a bypass is provided on the pulse valve of each pulse unit, and a seventh electric valve is provided on the bypass and can be switched on when gas is continuously blown to the filtration layer.

Specifically, below the filtration layer, a lower water inlet and a lower water outlet are provided on the bidirectional flow phosphorus removal filtration pool, and above the filtration layer, an upper water inlet and an upper water outlet are provided on the bidirectional flow phosphorus removal filtration pool;

the bidirectional water collection and distribution system includes a water inlet pipe and a water production pipe;

the water inlet pipe includes a main water inlet pipe, a first water inlet branch pipe and a second water inlet branch pipe that are communicated with a water outlet end of the main water inlet pipe. The first water inlet branch pipe is communicated with the lower water inlet, and a first power frequency pump and a fifth electric valve are provided thereon. The second water inlet branch pipe is communicated with the upper water inlet, and a second power frequency pump and a sixth electric valve are provided thereon;

the water production pipe includes an upward flow water production branch pipe, a downward flow water production branch pipe, a primary produced water discharge pipe and a main water production pipe that are communicated with water outlet ends of the upward flow water production branch pipe and the downward flow water production branch pipe, respectively. A third electric valve is provided on the upward flow water production branch pipe. A fourth electric valve is provided on the downward flow water production branch pipe. The main water production pipe is communicated with the water production tank, and a second electric valve is provided thereon. The primary produced water discharge pipe is communicated with a water inlet pipe of the prefiltration unit, and a first electric valve is provided thereon;

the apparatus includes a water quality monitor and a liquid level gauge. The water quality monitor is used for monitoring the quality of water in the upward flow water production branch pipe and the downward flow water production branch pipe. The liquid level gauge is provided above the filtration layer in the apparatus;

the control system is used for controlling opening and closing and operation frequency of the first power frequency pump and the second power frequency pump, controlling the fifth electric valve and the sixth electric valve to be switched on or off, and comparing a data signal of the water quality monitor with a preset value. When the data signal is greater than the preset value, the control system is used for controlling the first power frequency pump to open, the first electric valve stays in a switched on state, and upward flow produced water and downward flow produced water flow back to the water inlet pipe of the prefiltration unit through the primary produced water discharge pipe for recycling treatment. When the data signal is equal to or less than the preset value, the control system is used for controlling the second electric valve to stay in a switched on state, and upward flow produced water and downward flow produced water flow into the water production tank through the main water production pipe.

In a specific embodiment of the present disclosure, at least two bidirectional flow phosphorus removal filtration pools are connected in series, and preferably 3 bidirectional flow phosphorus removal filtration pools are connected in series.

In a second aspect, the present disclosure provides a bidirectional flow pulse-based water body phosphorus removal method. The water body phosphorus removal method is implemented in the water body phosphorus removal apparatus. The water body phosphorus removal method includes the following steps:

intercepting water to be dephosphorized by the prefiltration unit first to remove part of suspended solids therein, and enabling effluent water obtained after interception to flow into the bidirectional water collection and distribution system;

controlling the bidirectional water collection and distribution system, by the control system, to alternately perform upward water inflow and downward water inflow, so as to enable the effluent water obtained after interception to flow into the bidirectional flow phosphorus removal filtration pool, and performing phosphorus removal by switching between an upward flow filtration adsorption mode and a downward flow filtration adsorption mode through the filtration layer; and meanwhile, controlling the filtration pool stratified gas pulse system, by the control system, to perform stratified pulse gas flushing on the filtration layer.

In the present disclosure, the water to be dephosphorized may be phosphorus-containing reclaimed water of a reclaimed water plant.

Preferably, when the bidirectional flow phosphorus removal filtration pool stays in an upward flow filtration adsorption mode, the control system controls the filtration pool stratified gas pulse system to perform stratified pulse gas flushing on the filtration layer.

Preferably, due to a pulse pressure and a gas jet volume of the filtration pool stratified gas pulse system, the phosphorus removal filtration material has an instantaneous expansion rate of 30-50%.

Preferably, a pulse frequency of the filtration pool stratified gas pulse system is set according to a flow capacity of the filtration layer or an upward water inflow pressure.

In a preferred embodiment of the present disclosure, the water body phosphorus removal method includes the following steps:

S0, intercepting water to be dephosphorized by the prefiltration unit first to remove part of suspended solids therein, and enabling effluent water obtained after interception to flow into the bidirectional water collection and distribution system, wherein the effluent water obtained after interception has a turbidity of less than 1 nephelometric turbidity unit (NTU);

S1, controlling the water inlet pipe, by the control system, to perform upward water inflow, and enabling the effluent water obtained after interception to flow into the bidirectional flow phosphorus removal filtration pool through the lower water inlet;

S2, controlling opening and closing of the gas supply device and the pulse valves, by the control system, to perform stratified pulse gas flushing on the filtration layer;

S3, performing phosphorus removal on the effluent water obtained after interception by the bidirectional flow phosphorus removal filtration pool in an upward flow filtration adsorption mode, after the phosphorus removal is completed, enabling produced water to flow from the upper water outlet into the upward flow water production branch pipe and the main water production pipe, detecting the quality of the produced water by the water quality monitor, transmitting a data signal of the water quality monitor to the control system, and comparing the data signal with a preset value by the control system; when the signal is greater than the preset value, controlling the first electric valve to be switched on by the control system, and enabling the produced water to flow back to the water inlet pipe of the prefiltration unit through the primary produced water discharge pipe for recycling treatment; and otherwise, controlling the second electric valve to be switched on by the control system, and enabling the produced water to flow into the water production tank through the main water production pipe;

S4, when the phosphorus removal is performed in the upward flow filtration adsorption mode for a first preset time or an upward water inflow pressure is greater than a preset pressure value, controlling the water inlet pipe, by the control system, to perform downward water inflow, and enabling the effluent water obtained after interception to flow into the bidirectional flow phosphorus removal filtration pool through the upper water inlet; performing phosphorus removal on the effluent water obtained after interception by the bidirectional flow phosphorus removal filtration pool in a downward flow filtration adsorption mode, after the phosphorus removal is completed, enabling produced water to flow from the lower water outlet into the downward flow water production branch pipe, detecting the quality of the produced water by the water quality monitor, transmitting a data signal of the water quality monitor to the control system, and comparing the data signal with a preset value by the control system; when the data signal is greater than the preset value, controlling the first electric valve to be switched on by the control system, and enabling the produced water to flow back to the water inlet pipe of the prefiltration unit through the primary produced water discharge pipe for recycling treatment; and otherwise, controlling the second electric valve to be switched on by the control system, and enabling the produced water to flow into the water production tank through the main water production pipe; and S5, when the phosphorus removal is performed in the downward flow filtration adsorption mode for a second preset time or a liquid level of the bidirectional flow phosphorus removal filtration pool is equal to or greater than a preset liquid level, repeating steps S1 to S4.

The first preset time, the second preset time and the preset upward water inflow pressure are not specifically limited in the present disclosure, which can be determined by persons skilled in the art according to actual situations. Only an example is provided herein, the first preset time may be 2-3 hours; the second preset time may be 8-10 hours; and the preset pressure may be determined based on the height and weight of the filtration layer.

In a specific embodiment of the present disclosure, in step S1, controlling the water inlet pipe, by the control system, to perform upward water inflow means that the control system controls the variable frequency pump to operate and the fifth electric valve to be switched on, and the effluent water obtained after interception flows from the lower water inlet into the bidirectional flow phosphorus removal filtration pool through the main water inlet pipe and the first water inlet branch pipe.

In step S4, controlling the water inlet pipe, by the control system, to perform downward water inflow means that the control system controls the variable frequency pump to operate, the fifth electric valve to be switched off and the sixth electric valve to be switched on, and the effluent water obtained after interception flows from the upper water inlet into the bidirectional flow phosphorus removal filtration pool through the main water inlet pipe and the second water inlet branch pipe.

In another specific embodiment of the present disclosure, in step S1, controlling the water inlet pipe, by the control system, to perform upward water inflow means that the control system controls the first power frequency pump to operate and the fifth electric valve to be switched on, and the effluent water obtained after interception flows from the lower water inlet into the bidirectional flow phosphorus removal filtration pool through the main water inlet pipe and the first water inlet branch pipe.

In step S4, controlling the water inlet pipe, by the control system, to perform downward water inflow means that the control system controls the first power frequency pump to close, the fifth electric valve to be switched off, the second power frequency pump to operate and the sixth electric valve to be switched on, and the effluent water obtained after interception flows from the upper water inlet into the bidirectional flow phosphorus removal filtration pool through the main water inlet pipe and the second water inlet branch pipe.

Preferably, the water body phosphorus removal method further includes regenerating the phosphorus removal filtration material. During lye leaching or soaking, the filtration layer can be disturbed by a pulse jetting manner or a continuous gas blowing manner, thereby improving the regeneration efficiency of a saturated filtration material.

Preferably, stratified gas flushing is continuously performed on the filtration layer by the filtration pool stratified gas pulse system.

Preferably, the bidirectional flow phosphorus removal filtration pool operates in series of multiple stages, and preferably, 3 bidirectional flow phosphorus removal filtration pools operate in a mode that two bidirectional flow phosphorus removal filtration pools are connected in series of two stages and the third bidirectional flow phosphorus removal filtration pool is standby in one stage. For example, the 3 bidirectional flow phosphorus removal filtration pools include a bidirectional flow phosphorus removal filtration pool A, a bidirectional flow phosphorus removal filtration pool B and a bidirectional flow phosphorus removal filtration pool C. In a first working condition, the bidirectional flow phosphorus removal filtration pool A and the bidirectional flow phosphorus removal filtration pool B are used as a first stage and a second stage, respectively, and the bidirectional flow phosphorus removal filtration pool C is standby after regeneration. Then, in a second working condition, the bidirectional flow phosphorus removal filtration pool A is standby after regeneration, the bidirectional flow phosphorus removal filtration pool B is used as a first stage, and the bidirectional flow phosphorus removal filtration pool C is used as a second stage. Then, in a third working condition, the bidirectional flow phosphorus removal filtration pool C is used as a first stage, the bidirectional flow phosphorus removal filtration pool A is used as a second stage, and the bidirectional flow phosphorus removal filtration pool B is standby after regeneration.

In a third aspect, the present disclosure further provides an organic nutrient soil. The organic nutrient soil is prepared by using a phosphorus-rich solution obtained by regeneration of the phosphorus removal filtration material in the method.

Preferably, the organic nutrient soil with a slow release effect of phosphorus is prepared by using anaerobic digestion sludge of a reclaimed water plant as a raw material and the phosphorus-rich solution as a phosphorus source additive. A calcium salt or a magnesium salt is added into the phosphorus-rich solution to obtain calcium phosphate or magnesium ammonium phosphate (struvite), and then the calcium phosphate or the magnesium ammonium phosphate (struvite) is compounded with dewatered sludge with a moisture content of equal to or less than 60% in a reclaimed water plant to prepare the organic nutrient soil with a slow release effect of phosphorus. Nutrient indexes and other index levels of the organic nutrient soil meet the requirements of a drainage group enterprise standard "Preparation of Organic Nutrient Soil by Advanced Aerobic Digestion of Sludge (Q/BDG 45045-2017)" stipulated by Beijing Drainage Group, and the organic nutrient soil can be used for agriculture, forest land, horticultural cultivation or land improvement.

According to the bidirectional flow pulse-based water body phosphorus removal apparatus provided by the present disclosure, the control system controls the bidirectional water collection and distribution system to alternately perform upward water inflow and downward water inflow on the bidirectional flow phosphorus removal filtration pool, so as to control the bidirectional flow phosphorus removal filtration pool to switch between an upward flow filtration adsorption mode for phosphorus removal and a downward flow filtration adsorption mode for phosphorus removal. The control system controls the filtration pool stratified gas pulse system to perform stratified pulse gas flushing on the filtration layer, so as to prevent the filtration layer from being blocked and hardened. Furthermore, the adsorption capacity of the filtration material at a lower part of the filtration layer can be fully utilized, thereby improving the phosphorus adsorption efficiency.

The bidirectional flow pulse-based water body phosphorus removal apparatus provided by the present disclosure can realize in-situ regeneration of the phosphorus removal filtration material.

By means of the bidirectional flow pulse-based water body phosphorus removal method provided by the present disclosure, the adsorption capacity of the filtration material can be fully exerted by alternately changing a filtration direction up and down in combination with pulse gas flushing, the problems of blocking and hardening of the filtration layer are effectively avoided, and the phosphorus adsorption efficiency of the phosphorus removal filtration material is improved. Furthermore, the regeneration efficiency of the phosphorus removal filtration material can also be improved.

By means of the bidirectional flow pulse-based water body phosphorus removal method provided by the present disclosure, the phosphorus content (TP) of produced water can be controlled to be equal to or less than 0.025 mg/L.

Other features and advantages of the present disclosure will be described in detail in the following description of embodiments.

BRIEF DESCRIPTION OF THE DRAWINGS

The above contents and other purposes, features and advantages of the present disclosure will become more apparent from a more detailed description of exemplary embodiments of the present disclosure in combination with accompanying drawings, wherein same reference numerals generally refer to same parts in the exemplary embodiments of the present disclosure.

Figure 1:
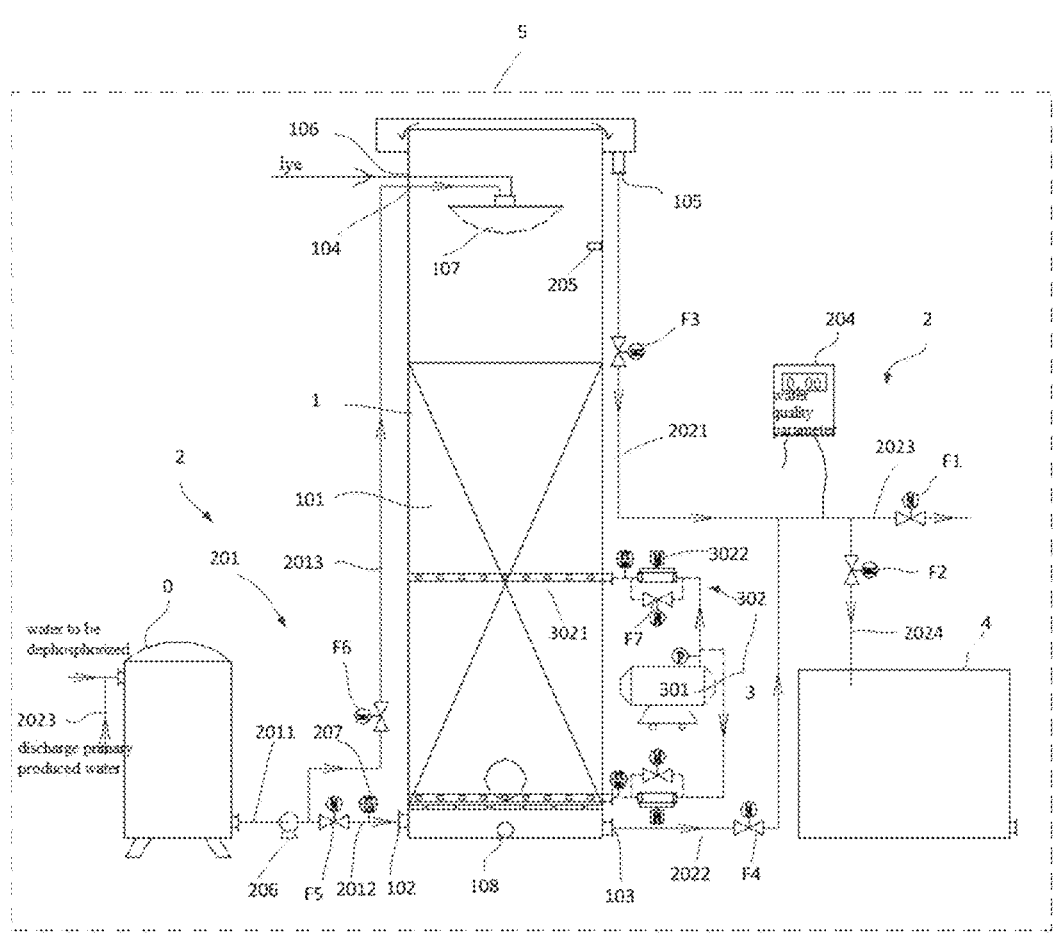
FIG. 1 shows a schematic diagram of a bidirectional flow pulse-based water body phosphorus removal apparatus provided by the present disclosure.

Reference numerals in the drawings are as follows:

0, prefiltration unit;
1, bidirectional flow phosphorus removal filtration pool;
101, filtration layer;
102, lower water inlet;
103, lower water outlet;
104, upper water inlet;
105, upper water outlet;
106, filtration material regeneration lye inlet;
107, water distributor;
108, phosphorus-rich lye recovery opening;
201, water inlet pipe;
202, upward flow water production pipe;
2021, upward flow water production main pipe;
2022, first upward flow water production branch pipe;
2023, second upward flow water production branch pipe;
203, downward flow water production pipe;
2031, downward flow water production main pipe;
2032, first downward flow water production branch pipe;
2033, second downward flow water production branch pipe;
204, water quality monitor;
205, liquid level gauge;
206, variable frequency pump;
207, pressure transmitter;
208, first power frequency pump;
209, second power frequency pump;
3, filtration pool stratified gas pulse system;
301, gas supply device;
302, pulse unit;
3021, pulse jet pipe;
3022, pulse valve;
4, water production tank;
5, control system;

F1, first electric valve;
F2, second electric valve;
F3, third electric valve;
F4, fourth electric valve;
F5, fifth electric valve;
F6, sixth electric valve;
F7, seventh electric valve.

DESCRIPTION OF THE EMBODIMENTS

Preferred embodiments of the present disclosure will be described in more detail below. While the preferred embodiments of the present disclosure are described below, it is to be understood that the present disclosure may be implemented in a variety of forms and should not be limited by the embodiments set forth herein.

The present disclosure provides a bidirectional flow pulse-based water body phosphorus removal apparatus. Referring to FIG. 1, the water body phosphorus removal apparatus includes: a prefiltration unit 0, a bidirectional flow phosphorus removal filtration pool 1, a bidirectional water collection and distribution system 2, a filtration pool stratified gas pulse system 3, a water production tank 4 and a control system 5. A filtration layer 101 filled with a phosphorus removal filtration material is provided in the bidirectional flow phosphorus removal filtration pool 1. The control system 5 is used for controlling the bidirectional water collection and distribution system to alternately perform upward water in-and-out flow and downward water in-and-out flow on the bidirectional flow phosphorus removal filtration pool 1, so as to control the bidirectional flow phosphorus removal filtration pool 1 to switch between an upward flow filtration adsorption mode for phosphorus removal and a downward flow filtration adsorption mode for phosphorus removal. The control system 5 is used for controlling the filtration pool stratified gas pulse system 3 to perform stratified pulse gas flushing on the filtration layer 101.

The bidirectional flow pulse-based water body phosphorus removal apparatus provided by the present disclosure has the following working principles.

The control system 5 controls the bidirectional water collection and distribution system 2 to alternately perform upward water inflow and downward water inflow on the bidirectional flow phosphorus removal filtration pool 1, so as to control the bidirectional flow phosphorus removal filtration pool 1 to switch between an upward flow filtration adsorption mode for phosphorus removal and a downward flow filtration adsorption mode for phosphorus removal. The control system 5 controls the filtration pool stratified gas pulse system 3 to perform stratified pulse gas flushing on the filtration layer 101, so as to prevent the filtration layer from being blocked and hardened. Furthermore, the adsorption capacity of the filtration material at a lower part of the filtration layer can be fully utilized, thereby improving the phosphorus adsorption efficiency.

Referring to FIG. 1 continuously, the water body phosphorus removal apparatus may have the following structures: below the filtration layer 101, a lower water inlet 102 and a lower water outlet 103 are provided on the bidirectional flow phosphorus removal filtration pool 1, and above the filtration layer 101, an upper water inlet 104 and an upper water outlet 105 are provided on the bidirectional flow phosphorus removal filtration pool 1.

Further, a water distributor 107 is provided at the top of the bidirectional flow phosphorus removal filtration pool 1. A filtration material regeneration lye inlet 106 is provided on the bidirectional flow phosphorus removal filtration pool 1. The filtration material regeneration lye inlet 106 and the upper water inlet 104 are both communicated with the water distributor 107. A phosphorus-rich lye recovery opening 108 is provided at a lower part of the bidirectional flow phosphorus removal filtration pool 1.

Referring to FIG. 1 continuously, the bidirectional water collection and distribution system 2 may have the following structures: the bidirectional water collection and distribution system 2 includes a water inlet pipe 201 and a water production pipe 202. The water inlet pipe 201 includes a main water inlet pipe 2011, a first water inlet branch pipe 2012 and a second water inlet branch pipe 2013 that are communicated with a water outlet end of the main water inlet pipe 2011, a variable frequency pump 206 is provided on the main water inlet pipe 2011, the first water inlet branch pipe 2012 is communicated with the lower water inlet 102, and the second water inlet branch pipe 2013 is communicated with the upper water inlet 104. A fifth electric valve F5 and a pressure transmitter 207 are provided on the first water inlet branch pipe 2012. A sixth electric valve F6 is provided on the second water inlet branch pipe 2013. The water production pipe 202 includes an upward flow water production branch pipe 2021, a downward flow water production branch pipe 2022, a primary produced water discharge pipe 2023 and a main water production pipe 2024 that are communicated with water outlet ends of the upward flow water production branch pipe 2021 and the downward flow water production branch pipe 2022, respectively. A third electric valve F3 is provided on the upward flow water production branch pipe 2021. A fourth electric valve F4 is provided on the downward flow water production branch pipe 2022. The main water production pipe 2024 is communicated with the water production tank 4, and a second electric valve F2 is provided thereon. The primary produced water discharge pipe 2023 is communicated with a water inlet pipe of the prefiltration unit 0, and a first electric valve F1 is provided thereon.

Figure 2:
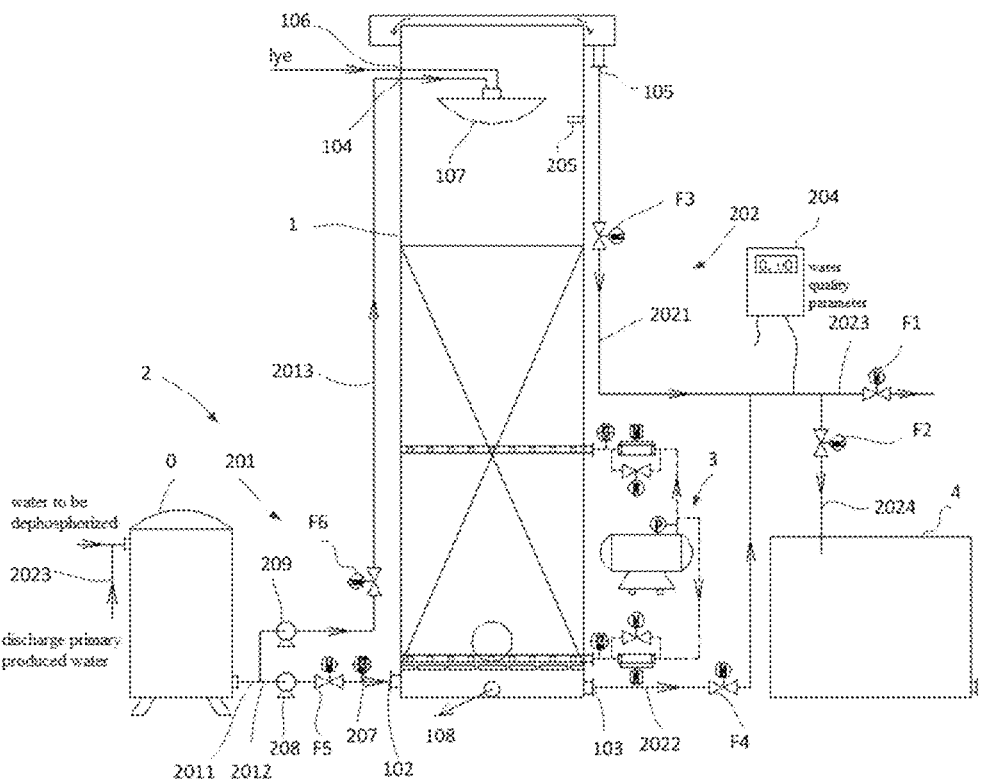
FIG. 2 shows a schematic diagram of another bidirectional flow pulse-based water body phosphorus removal apparatus provided by the present disclosure.

Referring to FIG. 2, differences between the water inlet pipe 201 in the bidirectional water collection and distribution system 2 in FIG. 2 and that in FIG. 1 are that the variable frequency pump is not provided on the main water inlet pipe 2011, while a first power frequency pump 208 and a second power frequency pump 209 are provided on the first water inlet branch pipe 2012 and the second water inlet branch pipe 2013, respectively. The bidirectional flow phosphorus removal filtration pool 1 realizes upward water in-and-out flow and downward water in-and-out flow through the first power frequency pump 208 and the second power frequency pump 209, respectively.

In the present disclosure, the bidirectional flow pulse-based water body phosphorus removal apparatus includes a water quality monitor 204 and a liquid level gauge 205. The water quality monitor 204 is used for monitoring the quality of water in the upward flow water production branch pipe 2021 and the downward flow water production branch pipe 2022. The liquid level gauge 205 is provided above the filtration layer 101 in the apparatus. After being detected by the water quality monitor, unqualified produced water flows back to the water inlet pipe of the prefiltration unit 0 through the primary produced water discharge pipe 2023 for recycling treatment; and qualified produced water flows into the water production tank 4 through the main water production pipe 2024. Specifically, the water quality monitor 204 is used for on-line monitoring of the turbidity, phosphate and other water quality indexes of produced water in the upward flow water production branch pipe 2021 and the downward flow water production branch pipe 2022. The liquid level gauge 205 is used for monitoring a liquid level height in the bidirectional flow phosphorus removal filtration pool in a downward flow filtration adsorption mode.

Referring to FIG. 1 continuously, in the present disclosure, the filtration pool stratified gas pulse system may have the following structures: the filtration pool stratified gas pulse system 3 includes a gas supply device 301 and pulse units 302. Each pulse unit 302 includes at least one group of pulse jet pipes 3021, a pipe for connecting the pulse jet pipes 3021 with the gas supply device 301, and a pulse valve 3022 provided on the pipe. The pulse jet pipes 3021 are distributed in a height direction of the filtration layer 101, wherein the bottommost pulse jet pipe 3021 is positioned below the filtration layer 101 and above the lower water inlet 102 and the lower water outlet 103. When the bidirectional flow phosphorus removal filtration pool 1 stays in an upward flow filtration adsorption mode, the control system 5 is used for controlling opening and closing of the gas supply device 301 and the pulse valves 3022 to perform stratified pulse gas flushing on the filtration layer 101.

Further, a bypass is provided on the pulse valve 3022 of each pulse unit 302, and a seventh electric valve F7 is provided on the bypass and can be switched on when gas is continuously blown to the filtration layer.

The pulse jet pipes 3021 in the filtration pool stratified gas pulse system 3 may have the following structures: the pulse jet pipes 3021 include main jet pipes and a plurality of branch jet pipes communicated with the main jet pipes. A plurality of gas holes or a plurality of nozzles are provided on each of the main jet pipes, and a sieve made from an anti-corrosion material is provided on each of the gas holes or each of the nozzles, which can prevent the gas holes or the nozzles from being blocked by solid impurities in water.

In the present disclosure, the control system 5 is used for controlling opening and closing and operation frequency of the variable frequency pump 206, controlling the fifth electric valve F5 and the sixth electric valve F6 to be switched on or off, and comparing a data signal of the water quality monitor 204 with a preset value. When the data signal is greater than the preset value, the control system 5 is used for controlling the first electric valve F1 to stay in a switched on state, and upward flow produced water and downward flow produced water flow back to the water inlet pipe of the prefiltration unit 0 through the primary produced water discharge pipe 2023 for recycling treatment. When the data signal is equal to or less than the preset value, the control system 5 is used for controlling the second electric valve F2 to stay in a switched on state, and upward flow produced water and downward flow produced water flow into the water production tank 4 through the main water production pipe 2024.

Further, the control system 5 is used for controlling the water inlet pipe 201 to alternately perform upward water inflow and downward water inflow on the bidirectional flow phosphorus removal filtration pool 1 according to a preset upward flow filtration time and a downward flow filtration time, or a pressure value detected by the pressure transmitter 207 and a liquid level height in the bidirectional flow phosphorus removal apparatus detected by the liquid level gauge 205, so as to enable the bidirectional flow phosphorus removal filtration pool 1 to switch between an upward flow filtration adsorption mode and a downward flow filtration adsorption mode.

Furthermore, in a case that the variable frequency pump 206 is provided on the main water inlet pipe 2011 of the water inlet pipe 201, in the upward flow filtration adsorption mode, the variable frequency pump 206 operates at a high frequency, the fifth electric valve F5 is switched on, the sixth electric valve F6 is switched off, and the control system 5 is used for comparing a data signal of the pressure transmitter 207 with a preset pressure value. When the data signal is less than the preset pressure value, the bidirectional flow phosphorus removal filtration pool 1 maintains the upward flow filtration adsorption mode. When the data signal is greater than the preset pressure value, the control system 5 is used for controlling the variable frequency pump 206 to operate at a low frequency, the fifth electric valve F5 is switched off, the sixth electric valve F6 is switched on, and the bidirectional flow phosphorus removal filtration pool 1 is switched from the upward flow filtration adsorption mode to the downward flow filtration adsorption mode. In the downward flow filtration adsorption mode, the control system 5 is used for comparing a data signal of the liquid level gauge 205 with a preset liquid level value. When the data signal is less than the preset liquid level value, the bidirectional flow phosphorus removal filtration pool 1 maintains the downward flow filtration adsorption mode. When the data signal is greater than the preset liquid level value, the control system 5 is used for controlling the variable frequency pump 206 to operate at a high frequency, the fifth electric valve F5 is switched on, the sixth electric valve F6 is switched off, and the bidirectional flow phosphorus removal filtration pool 1 is switched from the downward flow filtration adsorption mode to the upward flow filtration adsorption mode.

Furthermore, in a case that the first power frequency pump 208 and the second power frequency pump 209 are provided on the first water inlet branch pipe 2012 and the second water inlet branch pipe 2013 of the water inlet pipe 201, respectively, the control system 5 is used for controlling opening and closing and operation frequency of the first power frequency pump 208 and the second power frequency pump 209, controlling the fifth electric valve F5 and the sixth electric valve F6 to be switched on or off, and comparing a data signal of the water quality monitor 204 with a preset value. When the data signal is greater than the preset value, the control system 5 is used for controlling the first electric valve F1 to stay in a switched on state, and upward flow produced water and downward flow produced water flow back to the water inlet pipe of the prefiltration unit 0 through the primary produced water discharge pipe 2023 for recycling treatment. When the data signal is equal to or less than the preset value, the control system 5 is used for controlling the second electric valve F2 to stay in a switched on state, and upward flow produced water and downward flow produced water flow into the water production tank 4 through the main water production pipe 2024.

Figure 3:
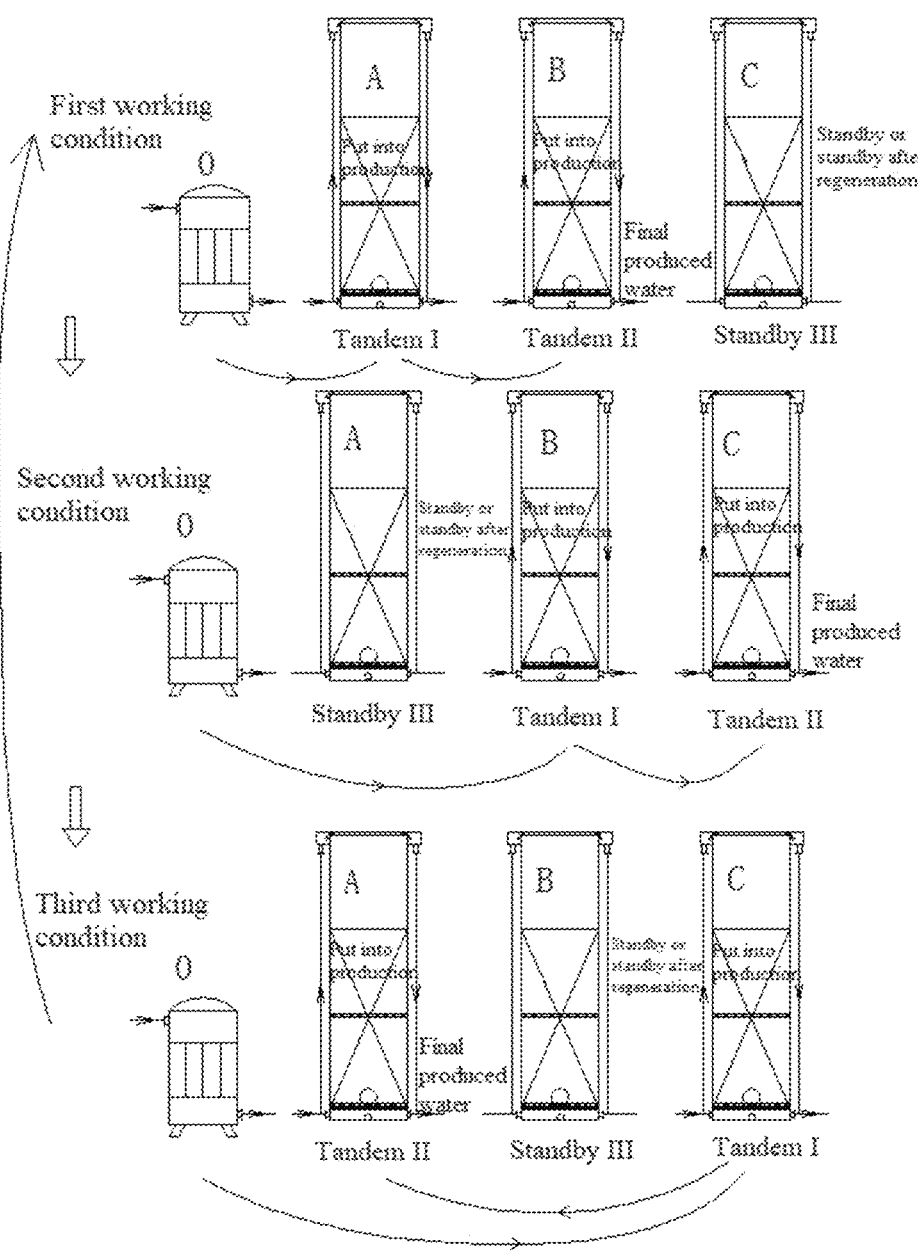
FIG. 3 shows a schematic diagram of another bidirectional flow pulse-based water body phosphorus removal apparatus provided by the present disclosure.

In the present disclosure, the bidirectional flow phosphorus removal filtration pool 1 operates in series of multiple stages, and preferably, 3 bidirectional flow phosphorus removal filtration pools operate in a mode that two bidirectional flow phosphorus removal filtration pools are connected in series of two stages and the third bidirectional flow phosphorus removal filtration pool is standby in one stage. Referring to FIG. 3, the 3 bidirectional flow phosphorus removal filtration pools include a bidirectional flow phosphorus removal filtration pool A, a bidirectional flow phosphorus removal filtration pool B and a bidirectional flow phosphorus removal filtration pool C. In a first working condition, the bidirectional flow phosphorus removal filtration pool A and the bidirectional flow phosphorus removal filtration pool B are used as a first stage and a second stage, respectively, and the bidirectional flow phosphorus removal filtration pool C is standby after regeneration. Then, in a second working condition, the bidirectional flow phosphorus removal filtration pool A is standby after regeneration, the bidirectional flow phosphorus removal filtration pool B is used as a first stage, and the bidirectional flow phosphorus removal filtration pool C is used as a second stage. Then, in a third working condition, the bidirectional flow phosphorus removal filtration pool C is used as a first stage, the bidirectional flow phosphorus removal filtration pool A is used as a second stage, and the bidirectional flow phosphorus removal filtration pool B is standby after regeneration.

The present disclosure further provides a bidirectional flow pulse-based water body phosphorus removal method. The water body phosphorus removal method is implemented in the water body phosphorus removal apparatus. The water body phosphorus removal method includes the following steps:

intercepting water to be dephosphorized by the prefiltration unit 0 first to remove part of suspended solids therein, and enabling effluent water obtained after interception to flow into the bidirectional water collection and distribution system 2;

controlling the bidirectional water collection and distribution system, by the control system 5, to alternately perform upward water inflow and downward water inflow, so as to enable the effluent water obtained after interception to flow into the bidirectional flow phosphorus removal filtration pool 1, and performing phosphorus removal by switching between an upward flow filtration adsorption mode and a downward flow filtration adsorption mode through the filtration layer 101; and meanwhile, controlling the filtration pool stratified gas pulse system 3, by the control system 5, to perform stratified pulse gas flushing on the filtration layer 101.

Preferably, when the bidirectional flow phosphorus removal filtration pool 1 stays in an upward flow filtration adsorption mode, the control system 5 controls the filtration pool stratified gas pulse system 3 to perform stratified pulse gas flushing on the filtration layer 101.

Preferably, due to a pulse pressure and a gas jet volume of the filtration pool stratified gas pulse system 3, the phosphorus removal filtration material has an instantaneous expansion rate of 30-50%; and a pulse frequency of the filtration pool stratified gas pulse system 3 is set according to a flow capacity of the filtration layer 101 or an upward water inflow pressure.

In a preferred embodiment of the present disclosure, the water body phosphorus removal method includes the following steps:

S0, intercepting water to be dephosphorized by the prefiltration unit 0 first to remove part of suspended solids therein, and enabling effluent water obtained after interception to flow into the bidirectional water collection and distribution system 2, wherein the effluent water obtained after interception has a turbidity of less than 1 NTU;

S1, controlling the water inlet pipe 201, by the control system 5, to perform upward water inflow, and enabling the effluent water obtained after interception to flow into the bidirectional flow phosphorus removal filtration pool 1 through the lower water inlet 102;

S2, controlling opening and closing of the gas supply device 301 and the pulse valves 3022, by the control system 5, to perform stratified pulse gas flushing on the filtration layer 101;

S3, performing phosphorus removal on the effluent water obtained after interception by the bidirectional flow phosphorus removal filtration pool 1 in an upward flow filtration adsorption mode, after the phosphorus removal is completed, enabling produced water to flow from the upper water outlet 105 into the upward flow water production branch pipe 2021 and the main water production pipe 2024, detecting the quality of the produced water by the water quality monitor 204, transmitting a data signal of the water quality monitor 204 to the control system 5, and comparing the data signal with a preset value by the control system 5; when the signal is greater than the preset value, controlling the first electric valve F1 to be switched on by the control system 5, and enabling the produced water to flow back to the water inlet pipe of the prefiltration unit 0 through the primary produced water discharge pipe 2023 for recycling treatment; and otherwise, controlling the second electric valve F2 to be switched on by the control system 5, and enabling the produced water to flow into the water production tank 4 through the main water production pipe 2024;

S4, when the phosphorus removal is performed in the upward flow filtration adsorption mode for a first preset time or an upward water inflow pressure is greater than a preset pressure value, controlling the water inlet pipe 201, by the control system 5, to perform downward water inflow, and enabling the effluent water obtained after interception to flow into the bidirectional flow phosphorus removal filtration pool 1 through the upper water inlet 104; performing phosphorus removal on the effluent water obtained after interception by the bidirectional flow phosphorus removal filtration pool 1 in a downward flow filtration adsorption mode, after the phosphorus removal is completed, enabling produced water to flow from the lower water outlet 103 into the downward flow water production branch pipe 2022, detecting the quality of the produced water by the water quality monitor 204, transmitting a data signal of the water quality monitor 204 to the control system 5, and comparing the data signal with a preset value by the control system 5; when the data signal is greater than the preset value, controlling the first electric valve F1 to be switched on by the control system 5, and enabling the produced water to flow back to the water inlet pipe of the prefiltration unit 0 through the primary produced water discharge pipe 2023 for recycling treatment; and otherwise, controlling the second electric valve F2 to be switched on by the control system 5, and enabling the produced water to flow into the water production tank 4 through the main water production pipe 2024; and S5, when the phosphorus removal is performed in the downward flow filtration adsorption mode for a second preset time or a liquid level of the bidirectional flow phosphorus removal filtration pool 1 is equal to or greater than a preset liquid level, repeating steps S1 to S4.

In a more preferred embodiment of the present disclosure, referring to FIG. 1, in step S1, controlling the water inlet pipe 201, by the control system 5, to perform upward water inflow means that the control system 5 controls the variable frequency pump 206 to operate and the fifth electric valve F5 to be switched on, and the effluent water obtained after interception flows from the lower water inlet 102 into the bidirectional flow phosphorus removal filtration pool 1 through the main water inlet pipe 2011 and the first water inlet branch pipe 2012. In step S4, controlling the water inlet pipe 201, by the control system 5, to perform downward water inflow means that the control system 5 controls the variable frequency pump 206 to operate, the fifth electric valve F5 to be switched off and the sixth electric valve F6 to be switched on, and the effluent water obtained after interception flows from the upper water inlet 104 into the bidirectional flow phosphorus removal filtration pool 1 through the main water inlet pipe 2011 and the second water inlet branch pipe 2013.

In another more preferred embodiment of the present disclosure, referring to FIG. 2, in step S1, controlling the water inlet pipe 201, by the control system 5, to perform upward water inflow means that the control system 5 controls the first power frequency pump 208 to operate and the fifth electric valve F5 to be switched on, and the effluent water obtained after interception flows from the lower water inlet 102 into the bidirectional flow phosphorus removal filtration pool 1 through the main water inlet pipe 2011 and the first water inlet branch pipe 2012. In step S4, controlling the water inlet pipe 201, by the control system 5, to perform downward water inflow means that the control system 5 controls the first power frequency pump 208 to close, the fifth electric valve F5 to be switched off, the second power frequency pump 209 to operate and the sixth electric valve F6 to be switched on, and the effluent water obtained after interception flows from the upper water inlet 104 into the bidirectional flow phosphorus removal filtration pool 1 through the main water inlet pipe 2011 and the second water inlet branch pipe 2013.

Preferably, the water body phosphorus removal method further includes regenerating the phosphorus removal filtration material.

Preferably, pulse gas blowing is continuously performed on the filtration layer 101 by the filtration pool stratified gas pulse system 3, or stratified gas flushing is continuously performed on the filtration layer 101 by switching on the electric valves on the bypasses of the pulse valves.

Preferably, in a case that the water body phosphorus removal apparatus includes 3 bidirectional flow phosphorus removal filtration pools in series, two bidirectional flow phosphorus removal filtration pools operate in series, and the third bidirectional flow phosphorus removal filtration pool is standby.

The present disclosure further provides an organic nutrient soil. The organic nutrient soil is prepared by using a phosphorus-rich solution obtained by regeneration of the phosphorus removal filtration material in the method.

Preferably, the organic nutrient soil with a slow release effect of phosphorus is prepared by using anaerobic digestion sludge of a reclaimed water plant as a raw material and the phosphorus-rich solution as a phosphorus source additive. A calcium salt or a magnesium salt is added into the phosphorus-rich solution to obtain calcium phosphate or magnesium ammonium phosphate (struvite), and then the calcium phosphate or the magnesium ammonium phosphate (struvite) is compounded with dewatered sludge with a moisture content of equal to or less than 60% in a reclaimed water plant to prepare the organic nutrient soil with a slow release effect of phosphorus. Nutrient indexes and other index levels of the organic nutrient soil meet the requirements of a drainage group enterprise standard "Preparation of Organic Nutrient Soil by Advanced Aerobic Digestion of Sludge (Q/BDG45045-2017)" stipulated by Beijing Drainage Group, and the organic nutrient soil can be used for agriculture, forest land, horticultural cultivation or land improvement.

Example 1

The example provides a bidirectional flow pulse-based water body phosphorus removal apparatus. Referring to FIG. 1, the water body phosphorus removal apparatus includes: a prefiltration unit 0, a bidirectional flow phosphorus removal filtration pool 1, a bidirectional water collection and distribution system 2, a filtration pool stratified gas pulse system 3, a water production tank 4 and a control system 5.

A filtration layer 101 formed by a phosphorus removal filtration material is provided in the bidirectional flow phosphorus removal filtration pool 1. Below the filtration layer 101, a lower water inlet 102 and a lower water outlet 103 are provided on the bidirectional flow phosphorus removal filtration pool 1, and above the filtration layer 101, an upper water inlet 104 and an upper water outlet 105 are provided on the bidirectional flow phosphorus removal filtration pool 1. A water distributor 107 is provided at the top of the bidirectional flow phosphorus removal filtration pool 1. A filtration material regeneration lye inlet 106 is provided on the bidirectional flow phosphorus removal filtration pool 1. The filtration material regeneration lye inlet 106 and the upper water inlet 104 are both communicated with the water distributor 107. A phosphorus-rich lye recovery opening 108 is provided at a lower part of the bidirectional flow phosphorus removal 1.

The bidirectional water collection and distribution system 2 includes a water inlet pipe 201 and a water production pipe 202. The water inlet pipe 201 includes a main water inlet pipe 2011, a first water inlet branch pipe 2012 and a second water inlet branch pipe 2013 that are communicated with a water outlet end of the main water inlet pipe 2011, a variable frequency pump 206 is provided on the main water inlet pipe 2011, the first water inlet branch pipe 2012 is communicated with the lower water inlet 102, and the second water inlet branch pipe 2013 is communicated with the upper water inlet 104. A fifth electric valve F5 and a pressure transmitter 207 are provided on the first water inlet branch pipe 2012. A sixth electric valve F6 is provided on the second water inlet branch pipe 2013. The water production pipe 202 includes an upward flow water production branch pipe 2021, a downward flow water production branch pipe 2022, a primary produced water discharge pipe 2023 and a main water production pipe 2024 that are communicated with water outlet ends of the upward flow water production branch pipe 2021 and the downward flow water production branch pipe 2022, respectively. A third electric valve F3 is provided on the upward flow water production branch pipe 2021. A fourth electric valve F4 is provided on the downward flow water production branch pipe 2022. The main water production pipe 2024 is communicated with the water production tank 4, and a second electric valve F2 is provided thereon. The primary produced water discharge pipe 2023 is communicated with a water inlet pipe of the prefiltration unit 0, and a first electric valve F1 is provided thereon.

The water quality monitor 204 is used for on-line monitoring of the turbidity and/or phosphate and other water quality indexes of produced water in the upward flow water production branch pipe 2021 and the downward flow water production branch pipe 2022. The liquid level gauge 205 is provided above the filtration layer 101 in the apparatus, and used for monitoring a liquid level height in the bidirectional flow phosphorus removal filtration pool in a downward flow filtration adsorption mode.

The filtration pool stratified gas pulse system 3 includes a gas supply device 301 and at least two pulse units 302. Each pulse unit 302 includes at least one group of pulse jet pipes 3021, a pipe for connecting the pulse jet pipes 3021 with the gas supply device 301, and a pulse valve 3022 provided on the pipe. All the pulse jet pipes 3021 are distributed in a height direction of the filtration layer 101, wherein the bottommost pulse jet pipe 3021 is positioned below the filtration layer 101 and above the lower water inlet 102 and the lower water outlet 103.

The control system 5 is used for controlling the water inlet pipe 201 to alternately perform upward water inflow and downward water inflow on the bidirectional flow phosphorus removal filtration pool 1 by controlling the variable frequency pump 206 to operate and the fifth electric valve F5 and the sixth electric valve F6 to be switched on or off, so as to enable the bidirectional flow phosphorus removal filtration pool 1 to switch between an upward flow filtration adsorption mode and a downward flow filtration adsorption mode. The control system 5 is used for comparing a data signal of the water quality monitor 204 with a preset value. When the data signal is greater than the preset value, the control system 5 is used for controlling the first electric valve F1 to stay in a switched on state, and produced water in the upward flow water production branch pipe 2021 and the downward flow water production branch pipe 2022 flows back to the water inlet pipe 201 for recycling treatment. When the data signal is equal to or less than the preset value, the control system 5 is used for controlling the second electric valve F2 to stay in a switched on state, and produced water in the upward flow water production branch pipe 2021 and the downward flow water production branch pipe 2022 flows into the water production tank 4. When the bidirectional flow phosphorus removal filtration pool 1 stays in an upward flow filtration adsorption mode, the control system 5 is used for controlling opening and closing of the gas supply device 301 and the pulse valves 3022, and gas is jetted from the pulse jet pipes 3021 to perform stratified pulse gas flushing on the filtration layer 101.

Example 2

The example provides a bidirectional flow pulse-based water body phosphorus removal method. Referring to FIG. 3, the method includes the following steps.

Three bidirectional flow phosphorus removal filtration pools form a set of two-use and one-standby production sequence. Effluent water from a municipal reclaimed water plant sequentially flows through two stages of bidirectional flow phosphorus removal filtration pools 1 in series. Each bidirectional flow phosphorus removal filtration pool 1 is filled with a multicomponent composite metal oxide phosphorus removal filtration material to form a filtration layer 101, the filtration layer 101 has a thickness of 2 m, and pulse jet pipes 3021 are provided in the middle and at the bottom of the filtration layer 101 separately. Each filtration pool operates in an alternate bidirectional flow mode, including downward water inflow or phosphorus removal in a downward flow filtration adsorption mode for 8 hours and upward water inflow or phosphorus removal in an upward flow filtration adsorption mode for 2 hours, wherein the total phosphorus content (TP) of the effluent water of the bidirectional flow phosphorus removal filtration pool 1 is maintained to be equal to or less than 0.025 mg/L.

In the upward flow filtration adsorption mode, a filtration pool stratified gas pulse system 3 is used to perform pulse gas flushing on the filtration layer 101 every 1 hour to keep the filtration layer 101 fluffy, and the filtration layer 101 has an instantaneous expansion rate of 40% when pulse valves 3022 are switched on. A first-stage tandem bidirectional flow phosphorus removal filtration pool A is changed into an in-situ regeneration mode after adsorption saturation, a standby bidirectional flow phosphorus removal filtration pool C is changed into a filtration mode and connected in series behind a primary second-stage tandem bidirectional flow phosphorus removal filtration pool B, the primary first-stage tandem bidirectional flow phosphorus removal filtration pool A is changed into a standby mode after regeneration, and the three bidirectional flow phosphorus removal filtration pools realize circulation of filtration and regeneration processes according to the above sequence. By alternately changing filtration directions of the bidirectional flow filtration pools up and down and circulating the filtration and regeneration processes of the three filtration pools, the filtration layers are effectively prevented from being blocked, and meanwhile, the adsorption capacity of the whole filtration layers is fully utilized.

When the total phosphorus concentration of the first-stage tandem filtration pool is greater than a preset value, that is to say, when TP is greater than 0.1 mg/L, the filtration material of the first-stage tandem filtration pool is required to undergo in-situ regeneration. 2 mol/L NaOH is injected into the filtration layer through a lye sprayer at the top of the filtration pool for soaking for 1 hour. During lye soaking, gas pulse units 302 are opened and closed every 10 minutes to disturb a regenerated phosphorus removal filtration material, thereby promoting a contact reaction between regenerated lye and the phosphorus removal filtration material and improving the resolution rate of adsorbed phosphate on the surface of the filtration material. After regeneration is performed for 1 hour, a regenerated phosphorus removal adsorption filtration material and regenerated phosphorus-rich lye are obtained.

The regenerated phosphorus removal adsorption filtration material is alternately washed with produced water of the bidirectional flow phosphorus removal filtration pool in upward water inflow and downward water inflow. In an upward flow washing process, the residual lye is discharged by a pulse gas flushing manner or a continuous gas blowing manner. After the pH of the washing water of the filtration tank is adjusted to neutral, the filtration material is completed washed, and the filtration pool is changed into a standby mode.

Example 3

This example provides an organic nutrient soil. A calcium salt or a magnesium salt is added into the regenerated phosphorus-rich lye obtained in Example 2 to obtain calcium phosphate or magnesium ammonium phosphate (struvite), and then the prepared calcium phosphate is compounded with dewatered sludge with a moisture content of equal to or less than 60% in a reclaimed water plant to prepare an organic nutrient soil with a slow release effect of phosphorus. In addition, the organic nutrient soil is used for forest land and horticultural cultivation, and specifically implemented in accordance with a drainage group enterprise standard "Technical Regulation for Application of Sludge Products from Municipal Wastewater Treatment Plants in Forest Land (Q/BDG 43046-2019)" stipulated by Beijing Drainage Group.

Various embodiments of the present disclosure have been described above, and the foregoing description is illustrative and not limiting and is not limited to the disclosed embodiments. Numerous modifications and changes will be apparent to those skilled in the art without departing from the scope and spirit of the illustrated embodiments.

What is claimed is:

1. A bidirectional flow pulse-based water body phosphorus removal apparatus, wherein the water body phosphorus removal apparatus comprises: a prefiltration unit, a bidirectional flow phosphorus removal filtration pool, a bidirectional water collection and distribution system, a filtration pool stratified gas pulse system, a water production tank and a control system;

a filtration layer filled with a phosphorus removal filtration material is provided in the bidirectional flow phosphorus removal filtration pool;

the control system is used for controlling the bidirectional water collection and distribution system to alternately perform upward water in-and-out flow and downward water in-and-out flow on the bidirectional flow phosphorus removal filtration pool, so as to control the bidirectional flow phosphorus removal filtration pool to switch between an upward flow filtration adsorption mode for phosphorus removal and a downward flow filtration adsorption mode for phosphorus removal; and the control system is used for controlling the filtration pool stratified gas pulse system to perform stratified pulse gas flushing on the filtration layer.

2. The water body phosphorus removal apparatus according to claim 1, wherein below the filtration layer, a lower water inlet and a lower water outlet are provided on the bidirectional flow phosphorus removal filtration pool, and above the filtration layer, an upper water inlet and an upper water outlet are provided on the bidirectional flow phosphorus removal filtration pool;

the bidirectional water collection and distribution system comprises a water inlet pipe and a water production pipe;

the water inlet pipe comprises a main water inlet pipe, a first water inlet branch pipe and a second water inlet branch pipe that are communicated with a water outlet end of the main water inlet pipe, a variable frequency pump is provided on the main water inlet pipe, the first water inlet branch pipe is communicated with the lower water inlet, and the second water inlet branch pipe is communicated with the upper water inlet; a fifth electric valve and a pressure transmitter are provided on the first water inlet branch pipe; a sixth electric valve is provided on the second water inlet branch pipe;

the water production pipe comprises an upward flow water production branch pipe, a downward flow water production branch pipe, a primary produced water discharge pipe and a main water production pipe that are communicated with water outlet ends of the upward flow water production branch pipe and the downward flow water production branch pipe, respectively; a third electric valve is provided on the upward flow water production branch pipe; a fourth electric valve is provided on the downward flow water production branch pipe; the main water production pipe is communicated with the water production tank, and a second electric valve is provided thereon; the primary produced water discharge pipe is communicated with a water inlet pipe of the prefiltration unit, and a first electric valve is provided thereon;

the apparatus comprises a water quality monitor and a liquid level gauge; the water quality monitor is configured to monitor the quality of water in the upward flow water production branch pipe and the downward flow water production branch pipe; the liquid level gauge is provided above the filtration layer in the apparatus;

the control system is configured to control start and stop as well as operation frequency of the variable frequency pump, control the fifth electric valve and the sixth electric valve to be switched on or off, and compare a data signal of the water quality monitor with a preset value; when the data signal is greater than the preset value, the control system is configured to control the first electric valve to stay in a switched on state, and upward flow produced water or downward flow produced water flow back to the water inlet pipe of the prefiltration unit through the primary produced water discharge pipe for recycling treatment; when the data signal is equal to or less than the preset value, the control system is configured to control the second electric valve to stay in a switched on state, and upward flow produced water or downward flow produced water flow into the water production tank through the main water production pipe;

the filtration pool stratified gas pulse system comprises a gas supply device and pulse units; each pulse unit comprises at least one group of pulse jet pipes, a connecting pipe for connecting the pulse jet pipes with the gas supply device, and a pulse valve provided on the connecting pipe;

the pulse jet pipes are distributed in a height direction of the filtration layer, wherein the bottommost pulse jet pipe is positioned below the filtration layer and above the lower water inlet and the lower water outlet;

when the bidirectional flow phosphorus removal filtration pool stays in an upward flow filtration adsorption mode, the control system is configured to control opening and closing of the gas supply device and the pulse valves to perform stratified pulse gas flushing on the filtration layer;

the pulse jet pipes comprise main jet pipes and a plurality of branch jet pipes communicated with the main jet pipes; and a plurality of gas holes or a plurality of nozzles are provided on each of the main jet pipes, and a sieve made from an anti-corrosion material is provided on each of the gas holes or each of the nozzles.

3. The water body phosphorus removal apparatus according to claim 2, wherein the control system is configured to control the water inlet pipe to alternately perform upward water inflow and downward water inflow on the bidirectional flow phosphorus removal filtration pool according to a preset upward flow filtration time and a downward flow filtration time, or a pressure value detected by the pressure transmitter and a liquid level height in the apparatus detected by the liquid level gauge, so as to enable the bidirectional flow phosphorus removal filtration pool to switch between an upward flow filtration adsorption mode and a downward flow filtration adsorption mode;

in the upward flow filtration adsorption mode, the variable frequency pump operates at a high frequency, the fifth electric valve is switched on, the sixth electric valve is switched off, and the control system is configured to compare a data signal of the pressure transmitter with a preset pressure value; when the data signal is less than the preset pressure value, the bidirectional flow phosphorus removal filtration pool maintains the upward flow filtration adsorption mode; when the data signal is greater than the preset pressure value, the control system is configured to control the variable frequency pump to operate at a low frequency, the fifth electric valve is switched off, the sixth electric valve is switched on, and the bidirectional flow phosphorus removal filtration pool is switched from the upward flow filtration adsorption mode to the downward flow filtration adsorption mode; in the downward flow filtration adsorption mode, the control system is configured to compare a data signal of the liquid level gauge with a preset liquid level value; when the data signal is less than the preset liquid level value, the bidirectional flow phosphorus removal filtration pool maintains the downward flow filtration adsorption mode; when the data signal is greater than the preset liquid level value, the control system is configured to control the variable frequency pump to operate at a high frequency, the fifth electric valve is switched on, the sixth electric valve is switched off, and the bidirectional flow phosphorus removal filtration pool is switched from the downward flow filtration adsorption mode to the upward flow filtration adsorption mode;

\a water distributor (is provided at the top of the bidirectional flow phosphorus removal filtration pool; a filtration material regeneration lye inlet is provided on the bidirectional flow phosphorus removal filtration pool; the filtration material regeneration lye inlet and the upper water inlet are both communicated with the water distributor;

the water quality monitor is configured to monitor a turbidity and a phosphate of the produced water in the upward flow water production branch pipe and the downward flow water production branch pipe; and \a bypass is provided on the pulse valve of each pulse unit, and a seventh electric valve is provided on the bypass and can be switched on when gas is continuously blown to the filtration layer.

4. The water body phosphorus removal apparatus according to claim 2, wherein the bidirectional flow phosphorus removal filtration pool operates in series of multiple stages, and three bidirectional flow phosphorus removal filtration pools operate in a mode that two bidirectional flow phosphorus removal filtration pools are connected in series of two stages and the third bidirectional flow phosphorus removal filtration pool is standby.

5. The water body phosphorus removal apparatus according to claim 1, wherein below the filtration layer, a lower water inlet and a lower water outlet are provided on the bidirectional flow phosphorus removal filtration pool, and above the filtration layer, an upper water inlet nd an upper water outlet are provided on the bidirectional flow phosphorus removal filtration pool;

the bidirectional water collection and distribution system comprises a water inlet pipe and a water production pipe;

the water inlet pipe comprises a main water inlet pipe, a first water inlet branch pipe and a second water inlet branch pipe that are communicated with a water outlet end of the main water inlet pipe; the first water inlet branch pipe is communicated with the lower water inlet, and a first power frequency pump and a fifth electric valve are provided thereon; the second water inlet branch pipe is communicated with the upper water inlet, and a second power frequency pump and a sixth electric valve are provided thereon;

the water production pipe comprises an upward flow water production branch pipe, a downward flow water production branch pipe, a primary produced water discharge pipe and a main water production pipe that are communicated with water outlet ends of the upward flow water production branch pipe and the downward flow water production branch pipe, respectively; a third electric valve is provided on the upward flow water production branch pipe; a fourth electric valve (F4) is provided on the downward flow water production branch pipe; the main water production pipe is communicated with the water production tank, and a second electric valve is provided thereon; the primary produced water discharge pipe is communicated with a water inlet pipe of the prefiltration unit, and a first electric valve is provided thereon;

the apparatus comprises a water quality monitor and a liquid level gauge; the water quality monitor is configured to monitor the quality of water in the upward flow water production branch pipe and the downward flow water production branch pipe; the liquid level gauge is provided above the filtration layer in the apparatus;

the control system is configured to control start and stop as well as operation frequency of the first power frequency pump and the second power frequency pump, control the fifth electric valve and the sixth electric valve to be switched on or off, and compare a data signal of the water quality monitor with a preset value; when the data signal is greater than the preset value, the control system is configured to control the first power frequency pump to start, the first electric valve stays in a switched on state, and upward flow produced water or downward flow produced water flow back to the water inlet pipe of the prefiltration unit through the primary produced water discharge pipe for recycling treatment; and when the data signal is equal to or less than the preset value, the control system is configured to control the second electric valve to stay in a switched on state, and upward flow produced water or downward flow produced water flow into the water production tank through the main water production pipe.

6. A bidirectional flow pulse-based water body phosphorus removal method, wherein the water body phosphorus removal method is implemented in the water body phosphorus removal apparatus according to claim 1, and the water body phosphorus removal method comprises the following steps:

enabling water to be dephosphorized to flow through the prefiltration unit first to remove suspended solids therein, and enabling effluent water to flow into the bidirectional water collection and distribution system;

controlling the bidirectional water collection and distribution system, by the control system, to alternately perform upward water inflow and downward water inflow, so as to enable the effluent water to flow into the bidirectional flow phosphorus removal filtration pool, and performing phosphorus removal by switching between an upward flow filtration adsorption mode and a downward flow filtration adsorption mode through the filtration layer; and meanwhile, controlling the filtration pool stratified gas pulse system, by the control system, to perform stratified pulse gas flushing on the filtration layer;

when the bidirectional flow phosphorus removal filtration pool stays in the upward flow filtration adsorption mode, the control system controls the filtration pool stratified gas pulse system to perform stratified pulse gas flushing on the filtration layer;

due to a pulse pressure and a gas jet volume of the filtration pool stratified gas pulse system, the phosphorus removal filtration material has an instantaneous expansion rate of 30-50%; and a pulse frequency of the filtration pool stratified gas pulse system is set according to a flow capacity of the filtration layer, a preset pulse period or an upward water inflow pressure.

7. The water body phosphorus removal method according to claim 6, the water body phosphorus removal method further comprises the following steps:

S0, intercepting water to be dephosphorized by the prefiltration unit first to remove part of suspended solids therein, and enabling effluent water obtained after interception to flow into the bidirectional water collection and distribution system, wherein the effluent water obtained after interception has a turbidity of less than 1 nephelometric turbidity unit (NTU);

S1, controlling a water inlet pipe, by the control system, to perform upward water inflow, and enabling the effluent water obtained after interception to flow into the bidirectional flow phosphorus removal filtration pool through the lower water inlet;

S2, controlling opening and closing of a gas supply device and a plurality of pulse valves, by the control system, to perform stratified pulse gas flushing on the filtration layer;

S3, performing phosphorus removal on the effluent water obtained after interception by the bidirectional flow phosphorus removal filtration pool in an upward flow filtration adsorption mode, after the phosphorus removal is completed, enabling produced water to flow from a upper water outlet into a upward flow water production branch pipe and a main water production pipe, detecting the quality of the produced water by the water quality monitor, transmitting a data signal of the water quality monitor to a control system, and comparing the data signal with a preset value by the control system; when the signal is greater than the preset value, controlling a first electric valve to be switched on by the control system, and enabling the produced water to flow back to a water inlet pipe of the prefiltration unit through a primary produced water discharge pipe for recycling treatment; and otherwise, controlling a second electric valve to be switched on by the control system, and enabling the produced water to flow into a water production tank through the main water production pipe;

S4, when the phosphorus removal is performed in the upward flow filtration adsorption mode for a first preset time or an upward water inflow pressure is greater than a preset pressure value, controlling the water inlet pipe, by the control system, to perform downward water inflow, and enabling the effluent water obtained after interception to flow into the bidirectional flow phosphorus removal filtration pool through an upper water inlet; performing phosphorus removal on the effluent water obtained after interception by the bidirectional flow phosphorus removal filtration pool in the downward flow filtration adsorption mode, after the phosphorus removal is completed, enabling produced water to flow from a lower water outlet into a downward flow water production branch pipe, detecting the quality of the produced water by the water quality monitor, transmitting a data signal of the water quality monitor to the control system, and comparing the data signal with a preset value by the control system; when the data signal is greater than the preset value, controlling the first electric valve to be switched on by the control system, and enabling the produced water to flow back to the water inlet pipe of the prefiltration unit through the primary produced water discharge pipe for recycling treatment; and otherwise, controlling the second electric valve to be switched on by the control system, and enabling the produced water to flow into the water production tank through the main water production pipe; and S5, when the phosphorus removal is performed in the downward flow filtration adsorption mode for a second preset time or the liquid level of the bidirectional flow phosphorus removal filtration pool is equal to or greater than a preset liquid level, repeating steps S1 to S4.

8. The water body phosphorus removal method according to claim 7, further comprising:

in step S1, controlling the water inlet pipe, by the control system, to perform upward water inflow means that the control system controls a variable frequency pump to operate and a fifth electric valve to be switched on, and the effluent water obtained after interception flows from the lower water inlet into the bidirectional flow phosphorus removal filtration pool through the main water inlet pipe and the first water inlet branch pipe;

in step S4, controlling the water inlet pipe, by the control system, to perform downward water inflow means that the control system controls the variable frequency pump to operate, the fifth electric valve to be switched off and a sixth electric valve to be switched on, and the effluent water obtained after interception flows from the upper water inlet into the bidirectional flow phosphorus removal filtration pool through the main water inlet pipe and a second water inlet branch pipe;

the water body phosphorus removal method further comprises regenerating the phosphorus removal filtration material; and pulse gas blowing is continuously performed on the filtration layer by the filtration pool stratified gas pulse system, or stratified gas flushing is continuously performed on the filtration layer by switching on the electric valves on the bypasses of the pulse valves.

9. The water body phosphorus removal method according to claim 7, further comprising:

in step S1, controlling the water inlet pipe, by the control system, to perform upward water inflow means that the control system controls a first power frequency pump to operate and a fifth electric valve to be switched on, and the effluent water obtained after interception flows from the lower water inlet into the bidirectional flow phosphorus removal filtration pool through a main water inlet pipe and a first water inlet branch pipe;

in step S4, controlling the water inlet pipe, by the control system, to perform downward water inflow means that the control system controls the first power frequency pump to close, the fifth electric valve to be switched off, a second power frequency pump to operate and a sixth electric valve to be switched on, and the effluent water obtained after interception flows from the upper water inlet into the bidirectional flow phosphorus removal filtration pool through the main water inlet pipe and a second water inlet branch pipe; and in a case that the water body phosphorus removal apparatus comprises three bidirectional flow phosphorus removal filtration pools in series, two bidirectional flow phosphorus removal filtration pools operate in series, and the third bidirectional flow phosphorus removal filtration pool is in standby.

10. An organic nutrient soil, wherein the organic nutrient soil is prepared by using a phosphorus-rich solution obtained by regeneration of the phosphorus removal filtration material in the method according to claim 9; and the organic nutrient soil is prepared by using anaerobic digestion sludge of a reclaimed water plant as a raw material and the phosphorus-rich solution as a phosphorus source additive.

* * * * *